United States Patent
Miller et al.

(10) Patent No.: US 10,920,665 B2
(45) Date of Patent: Feb. 16, 2021

(54) STANDBY GENERATOR INCLUDING MULTIPLE EXERCISE CYCLES WITH AMBIENT TEMPERATURE CONTROL

(71) Applicant: BRIGGS & STRATTON CORPORATION, Wauwatosa, WI (US)

(72) Inventors: Michael Miller, Lake Mills, WI (US);
Dean Weigand, Waukesha, WI (US);
Rick Jungmann, Richfield, WI (US);
Robert Townsend, Delafield, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 16/521,893

(22) Filed: Jul. 25, 2019

(65) Prior Publication Data

US 2020/0032700 A1    Jan. 30, 2020

Related U.S. Application Data

(60) Provisional application No. 62/703,111, filed on Jul. 25, 2018.

(51) Int. Cl.
| | |
|---|---|
| F02B 63/04 | (2006.01) |
| H02K 7/18 | (2006.01) |
| F02N 11/08 | (2006.01) |
| F02B 77/08 | (2006.01) |
| F02N 11/06 | (2006.01) |
| H02K 11/25 | (2016.01) |

(52) U.S. Cl.
CPC ............ *F02B 63/04* (2013.01); *F02B 77/083* (2013.01); *F02N 11/06* (2013.01); *F02N 11/08* (2013.01); *H02K 7/1815* (2013.01); *H02K 11/25* (2016.01)

(58) Field of Classification Search
CPC ..... F02B 63/04; F02B 77/083; H02K 7/1815; H02K 11/25; F02N 11/08; F02N 11/06; F02N 2200/122; F02N 11/04; F02N 11/0837
USPC ............................................. 290/30 A, 30 B
See application file for complete search history.

(56) References Cited

U.S. PATENT DOCUMENTS

| | | | |
|---|---|---|---|
| 7,889,089 B1* | 2/2011 | Bollin ................. | G01R 31/343 320/134 |
| 9,874,190 B2 | 1/2018 | Priem et al. | |

(Continued)

*Primary Examiner* — Charles Reid, Jr.
(74) *Attorney, Agent, or Firm* — Foley & Lardner LLP

(57) ABSTRACT

A method and system for exercising a standby generator is disclosed. The standby generator can be exercised in at least two different exercise cycles, including an express exercise cycle and an extended exercise cycle. The system and method operates the generator for an express exercise cycle having a first duration when the ambient temperature at or near the standby generator exceeds a minimum threshold temperature. If the ambient temperature does not exceed the minimum threshold temperature, the express exercise cycle does not begin. In addition to the express exercise cycle, the engine of the standby generator is started and run for an extended exercise cycle having a duration that exceeds the duration of the express exercise cycle. The extended exercise cycles are separated by a first interval while the express exercise cycles are separated by a second interval, where the first interval is longer than the second interval.

20 Claims, 4 Drawing Sheets

(56) References Cited

U.S. PATENT DOCUMENTS

| | | | |
|---|---|---|---|
| 2012/0053884 A1* | 3/2012 | Batzler | H02J 9/08 |
| | | | 702/122 |
| 2017/0167353 A1* | 6/2017 | Pitcel | F01P 1/06 |
| 2018/0094598 A1 | 4/2018 | Weigand et al. | |

* cited by examiner

STANDBY GENERATOR INCLUDING MULTIPLE EXERCISE CYCLES WITH AMBIENT TEMPERATURE CONTROL

CROSS REFERENCE TO RELATED APPLICATION

The present application is based on and claims priority to U.S. Provisional Patent Application Ser. No. 62/703,111, filed Jul. 25, 2018, the disclosure of which is incorporated herein by reference.

BACKGROUND

Standby generators typically include internal combustion engines. Internal combustion engines can operate using a variety of different fuel sources including liquid propane, natural gas, gasoline, diesel, etc. In general, standby generators are connected to an application site, such as a home or business, and to a surrounding power grid.

In the event of a loss of electrical power from the surrounding power grid, a standby generator is designed to turn on and provide a certain amount of electrical power to the application site. To be prepared for power outages, standby generators typically run through a routine "exercise cycle" multiple times throughout the life of the standby generator to test operation of the standby generator. For certain generators, these exercise cycles can occur as often as multiple times per week.

It is during these exercise cycles that individuals often become aware of the noise, fuel consumption, and other implications involved with owning and maintaining a standby generator. Frequent exercise cycles are often unnecessary for the routine maintenance of the standby generator. Reducing the number of exercise cycles and/or reducing the duration of a majority of the exercise cycles can help to reduce the noise, fuel consumption, and fuel emissions resulting from the performance of exercise cycles. As such, reducing the duration of the exercise cycles during the life of a standby generator can not only reduce any nuisance resulting from noise of the generator, but is also more environmentally friendly.

SUMMARY

The present disclosure generally relates to the operation of a standby generator, and, more particularly to the controls for a standby generator to operate the standby generator during exercise cycles.

According to one exemplary embodiment of the present disclosure, a method of exercising a standby generator includes initially determining if the standby generator is due for an extended exercise cycle. The extended exercise cycle occurs at a first interval of time. If the method determines that the standby generator is due for an extended exercise cycle, the engine of the standby generator is started and run for an extended exercise cycle. In addition to determining whether the standby generator is due for the extended exercise cycle, the method determines if the standby generator is due for an express exercise cycle. The express exercise cycle occurs at a second interval of time, where the first interval of time between the extended exercise cycles is much greater than the second interval of time between the express exercise cycles.

Prior to operating the standby generator for the express exercise cycle, the method detects an ambient temperature at or near the standby generator. If the ambient temperature is below a minimum threshold temperature, the engine of the standby generator is not operated. However, if the ambient temperature exceeds a minimum threshold temperature, the engine of the standby generator is started and run for the express exercise cycle. Since the duration of the express exercise cycle is relatively short, the system and method does not start the engine for the express exercise cycle when the ambient temperature is below the minimum threshold temperature to protect the engine from condensed moisture build up in the oil supply.

In another exemplary embodiment, if the express exercise cycle is skipped due to the ambient temperature falling below the minimum threshold temperature, the system and method restarts the second interval between the express exercise cycles. In accordance with another exemplary embodiment, the method can continuously monitor the ambient temperature after the express exercise cycle is skipped and starts the engine for the express exercise cycle when the ambient temperature exceeds the minimum threshold temperature. After beginning the express exercise cycle, the second interval between the express exercise cycles is reset.

BRIEF DESCRIPTION OF THE DRAWINGS

The drawings illustrate the best mode presently contemplated of carrying out the disclosure. In the drawings.

DETAILED DESCRIPTION

Figure 1:
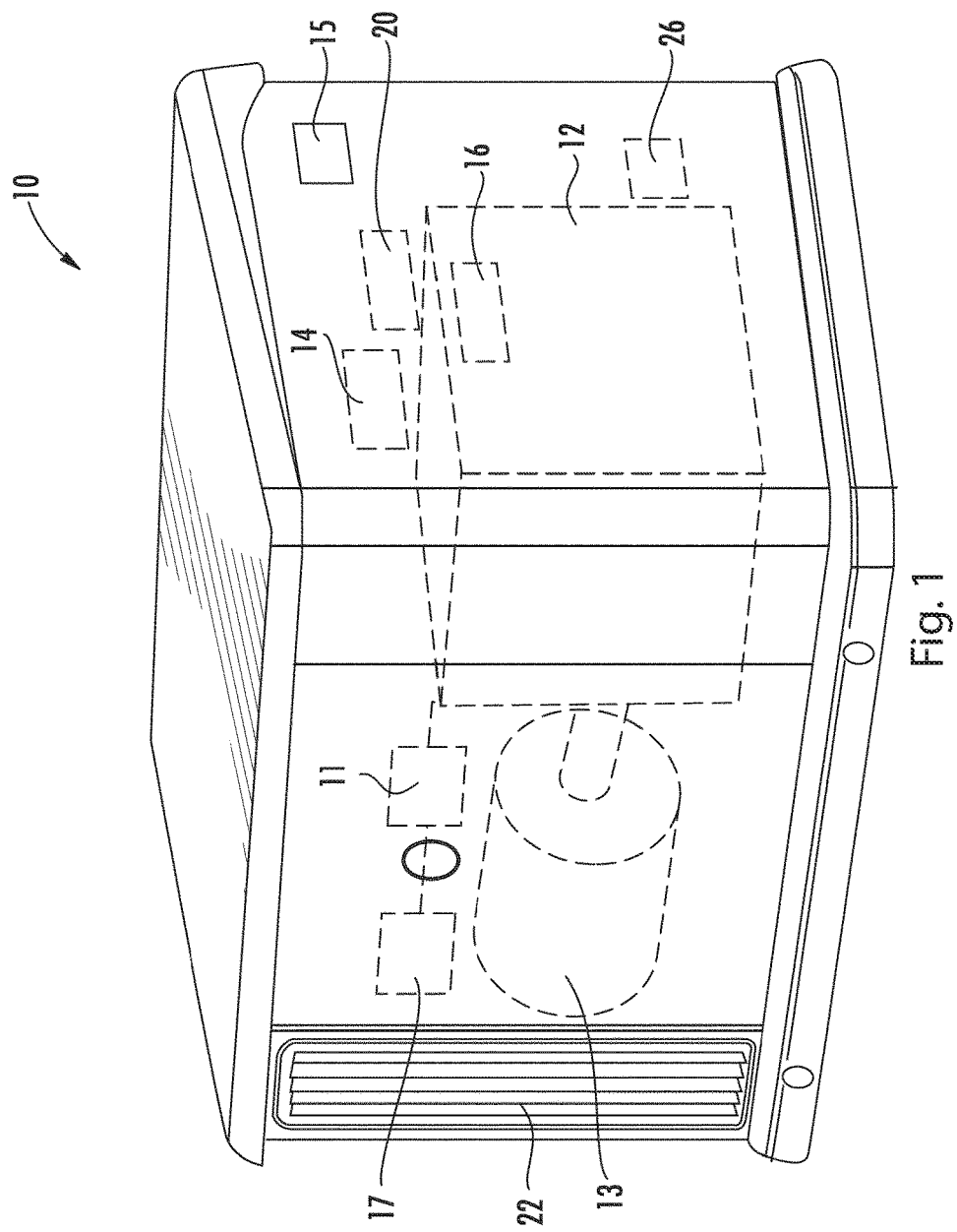
FIG. 1 is a schematic diagram of a standby generator, according to an exemplary embodiment.

Referring to FIG. 1, a generator is shown according to an exemplary embodiment. The generator 10 includes an engine 12, including a starter motor 11, air/fuel mixing device 14, governor 16, throttle 20, air intake 22, exhaust outlet 26, and an alternator 13 driven by the engine 12. The starter motor 11 rotates a crankshaft to start the engine 12. The alternator 13 produces electrical power from input mechanical power from the engine 12. The alternator 13 charges a battery 17, which stores energy for use by the electrical systems of the generator. The generator 10 additionally includes one or more outputs 15 for supply of the generated electrical power to an electrical device of a user's choosing. Air flows into the engine 12 from the air intake 22 and through the air/fuel mixing device 14. As air passes through the air/fuel mixing device 14, the air mixes with fuel entering the air/fuel mixing device 14 and creates an air/fuel mixture that then enters the engine 12. The throttle 20 controls the flow of the air/fuel mixture that exits the air/fuel mixing device 14. The governor 16 controls the position of the throttle 20 based on a detected load on the engine 12. In one embodiment, the governor 16 is an electronic governor. In another embodiment, the governor 16 is a mechanical governor. The air/fuel mixture leaving the air/fuel mixing device 14 is combusted in one or more cylinders of the engine 12 and exhaust gas from combustion leaves the engine 12 through the exhaust outlet 26. In one embodiment, the air/fuel mixing device includes an electronic fuel injection (EFI) system. In another embodiment, the air/fuel mixing device includes a carburetor.

Figure 2:
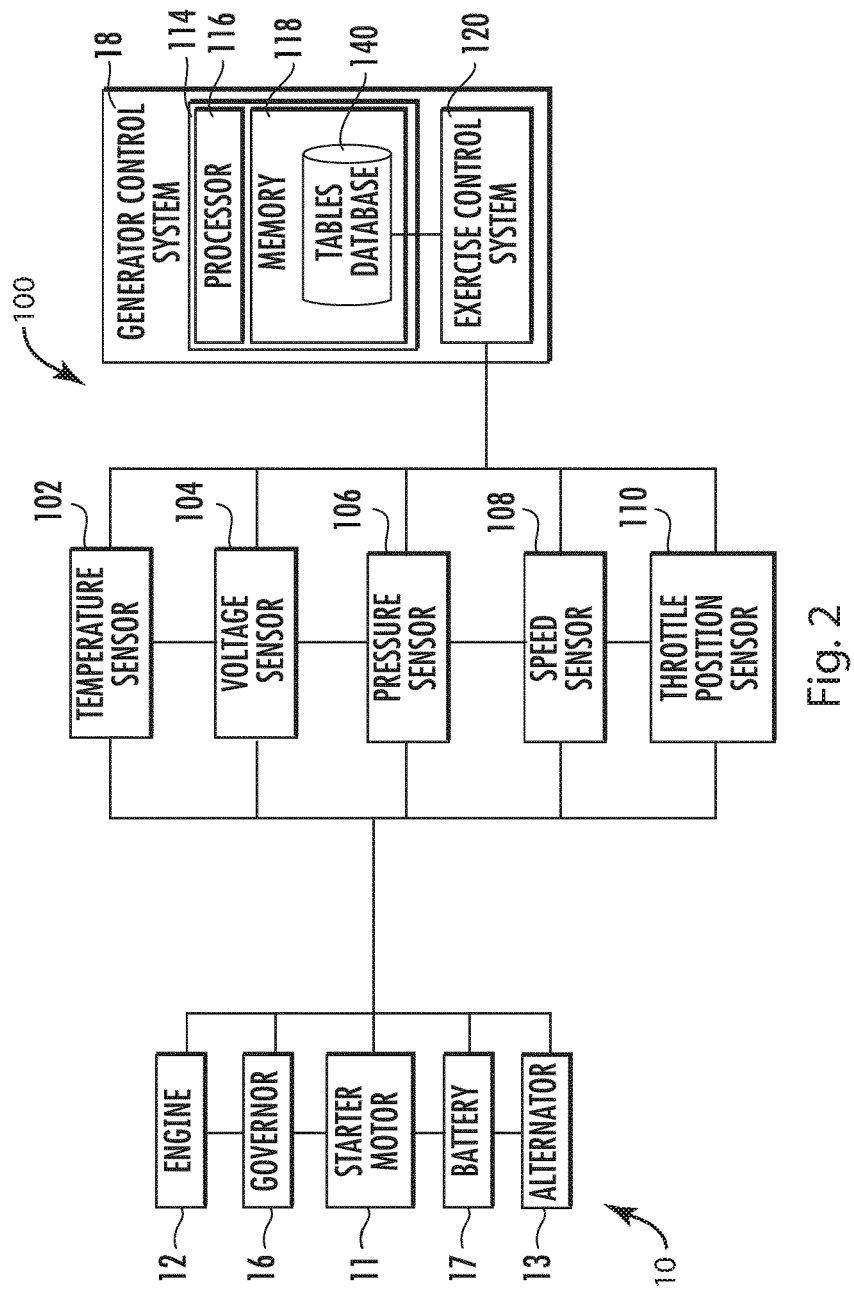
FIG. 2 is a schematic diagram of a exercise cycle management system, according to an exemplary embodiment.

Referring to FIG. 2, an exercise cycle management system 100 for a generator 10 is illustrated according to an exemplary embodiment. The exercise cycle management system 100 includes an exercise control system 120, a temperature sensor 102, a voltage sensor 104, a pressure sensor 106, a speed sensor 108, and a throttle position sensor 110, all communicably and operatively coupled to the exercise control system 120. In some embodiments, the exercise cycle management system 100 includes more or less sensors than are shown in FIG. 2. As shown, the exercise cycle management system 100 includes a generator control system 18, which includes and operates the exercise control system 120.

The temperature sensor 102 is structured as an ambient temperature sensor that detects the temperature at or near the location of the generator 10. The temperature sensor 102 can be mounted at any location at or near the standby generator where the temperature sensor 102 is able to make an accurate measurement of the ambient temperature. In an alternate embodiment, the temperature sensor 102 could be replaced with a communication device that can receive an ambient temperature reading from a remote location, such as a software weather app or from any other source that is able to determine an ambient temperature of the location where the standby generator is located. As will be described in detail below, the ambient temperature will be used by the exercise cycle management system 100 to determine whether an exercise cycle should be run or what type of exercise cycle should be run.

The voltage sensor 104 is structured to measure the voltage output of the alternator 13. In one embodiment, the voltage across the battery 17 of the generator 10 is measured. In this regard, the voltage sensor 104 is communicably and operatively coupled to the battery 17 to detect the voltage across the battery 17. In some embodiments, the voltage sensor 104 includes a voltmeter. One lead is connected to one terminal on the battery 17 and another lead is connected to a second terminal on the battery 17 to determine the voltage across the battery 17. In another embodiment, the voltage at a starter solenoid is measured while the engine 12 is being cranked. In this regard, the voltage sensor 104 is communicably and operatively coupled to the starter solenoid to measure the output voltage.

The pressure sensor 106 is configured to sense an oil pressure of the engine 12 in the system 100. In one embodiment, the pressure sensor 106 includes a pressure gauge to detect the oil pressure. In some embodiments, the pressure sensor 106 is part of the OPS. In one embodiment, the pressure can be sensed while the engine 12 is cranking, but not yet started. In another embodiment, the pressure can be sensed while the engine 12 is running.

The exercise cycle management system 100 also includes a speed sensor 108. The speed sensor 108 is structured to detect an engine speed. In some embodiments, the speed sensor 108 receives an output from the alternator that corresponds to engine speed. The speed sensor 108 is communicably coupled to the alternator 13 of the engine 12, such that the output current of the alternator is detected, from which a corresponding engine speed is determined. Alternatively, engine speed can be measured directly at the engine 12 by an engine speed sensor. In this case, the engine speed can be measured at the starter solenoid when engaged.

Still referring to FIG. 2, the exercise cycle management system 100 also includes a throttle position sensor 110. The throttle position sensor 110 is structured to detect a position of the throttle 20 (e.g., percent open). In that regard, the throttle position sensor 110 is communicably and operatively coupled to the throttle 20 to detect a position of the throttle 20. In one embodiment, the throttle position sensor 110 is coupled to the throttle lever, such that the position of the throttle lever is detected, indicating a position of the throttle. In other embodiments, the throttle position sensor 110 may be coupled to any other component indicative of the throttle 20 position, such as a linkage between the governor 16 and the throttle 20.

In FIG. 2, the sensors are shown to attach to the generator 10, but may be attached to various specific locations of the engine 12 or other components. For example, the sensors may be attached to the housing, engine block, cylinder head, crank shaft, cylinder, cam shaft, valve cover, or other suitable location on the engine 12.

In other contemplated embodiments, more or less sensors can be included. The sensors may measure operating speed of the engine 12, rotations of the crank shaft of the engine 12, rotations of the cam shaft of the engine 12, operating time of the engine 12, oil temperature of the engine 12, air-to-fuel ratio of the engine 12, mass air flow of the engine 12, mass air pressure of the engine 12, and other suitable measurements of the engine 12. According to various embodiments, sensors may be thermocouples, air flow meters, flow sensors, mass air flow sensors, rotary encoders, tachometers, hall effect sensors, speedometers, manifold absolute pressure sensors, oxygen sensors, speed sensors, throttle position sensors, torque sensors, variable reluctance sensors, vehicle speed sensors, and other suitable sensors. The processing circuit may be configured to receive readings from the internal combustion engine sensors and/or ambient sensors and determine, among other calculations, an appropriate operation manner for the generator 10.

The exercise cycle management system 100 further includes a generator control system 18. As shown, the generator control system 18 includes a processing circuit 114, which may include a processor 116 and one or more memory devices 118. The processor 116 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 118 (e.g., RAM, NVRAM, ROM, Flash Memory, hard disk storage) may store data and/or computer code for facilitating the various processes described herein. Moreover, the one or more memory devices 118 may be or include tangible, non-transient volatile memory or non-volatile memory. Accordingly, the one or more memory devices 118 may include database components, object code components, script components, or any other type of information structure for supporting the various activities and information structures described herein.

The generator control system 18 further includes a tables database 140. The tables database 140 holds, stores, categorizes, and otherwise serves as a repository for the engine look-up tables corresponding to a time at which the engine should be shut down to prevent oxygen depletion. The tables database 140 stores values including, but not limited to, temperature, altitude, load, frequency, and throttle position that may be used to determine from which table the exercise control system 120 pulls and utilizes information. As an example, the tables database 140 stores value ranges for each parameter that is measured by the system 100. The measured values can be compared to the stored values in the tables database 140 to determine the health of that particular component of the generator 10.

The tables database 140 is structured to provide access to information relating to the sensed values of the engine. In this regard, the tables database 140 is communicably and operatively coupled to the exercise control system 120 to provide access to such information, such that the exercise control system 120 may perform a certain operation (e.g., start engine, crank engine, shut down unit, send notification, etc.) based on those values.

Figure 3:
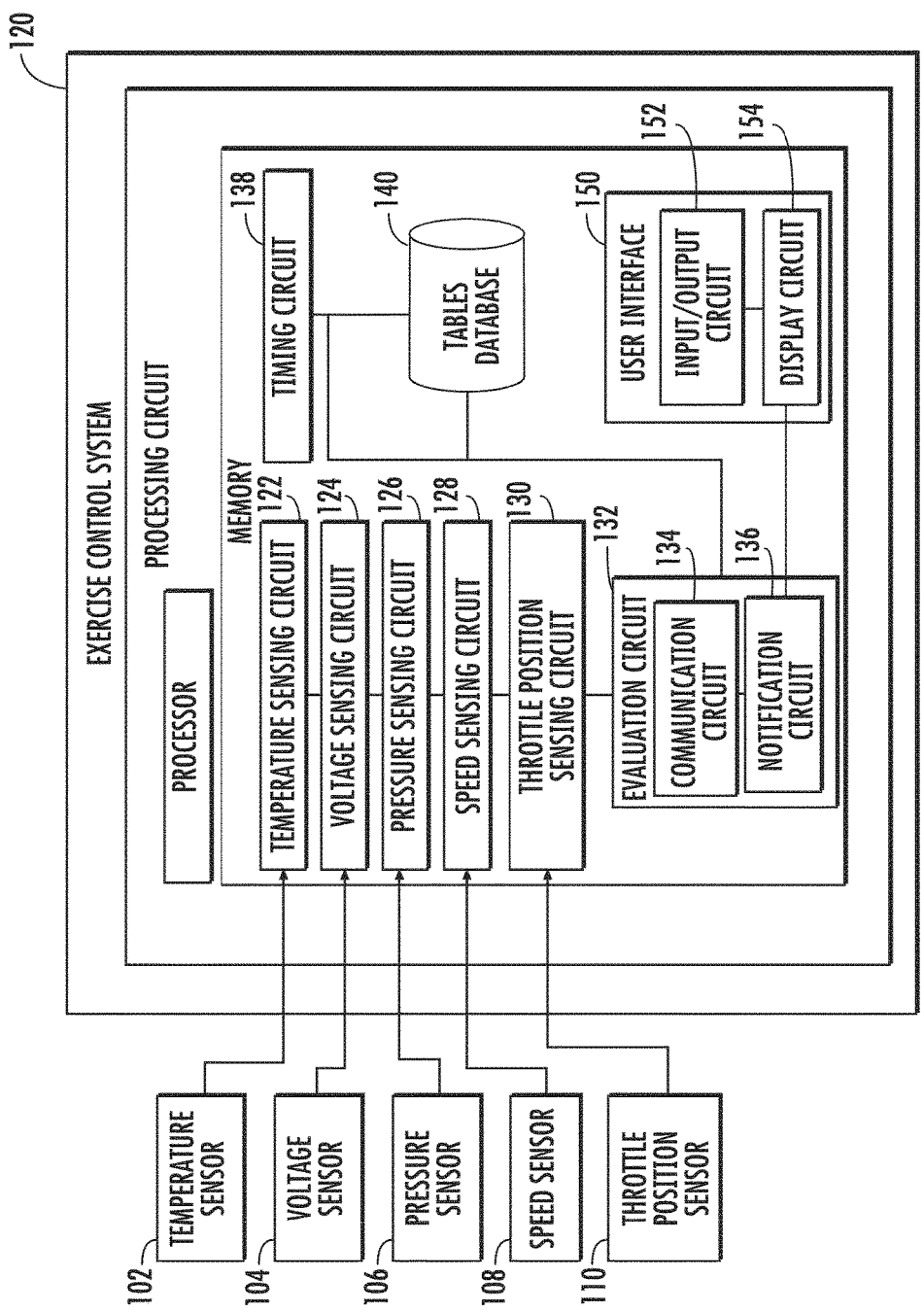
FIG. 3 is a schematic diagram of an exercise control system of the generator control system of FIG. 2, according to an exemplary embodiment.

Referring now to FIG. 3, a diagram of an exercise control system 120 and part of the generator control system 18 of FIG. 2 are shown according to an exemplary embodiment. As mentioned above, the exercise control system 120 may be embodied with the generator control system 18. Accordingly, the exercise control system 120 may be embodied or at least partly embodied in the memory device 118, where at least some operations may be executable from the processing circuit 114. The exercise control system 120 is shown to include a temperature sensing circuit 122, voltage sensing circuit 124, pressure sensing circuit 126, speed sensing circuit 128, throttle position sensing circuit 130, evaluation circuit 132, timing circuit 138, and user interface 150, with all such circuits communicably coupled with each other. Other embodiments may include more or less circuits without departing from the spirit and scope of the present disclosure.

Each of the sensing circuits shown in FIG. 3 is structured to receive values from the corresponding sensors. The temperature sensing circuit 122 is structured to receive a value of ambient temperature from the temperature sensor 102. The voltage sensing circuit 124 is structured to receive a value of generator output voltage from the voltage sensor 104. The pressure sensing circuit 126 is structured to receive a value of oil pressure from the pressure sensor 106. The speed sensing circuit 128 is structured to receive an engine speed value from the speed sensor 108. The throttle position sensing circuit 130 is structured to receive a detected value of a throttle position from the throttle position sensor 110. All of these values are used in the evaluation circuit 132 to determine the health of the generator 10 and the timing of running an exercise cycle, as described further herein.

The evaluation circuit 132 is structured to communicate with each of the temperature, voltage, pressure, speed, and throttle position sensing circuits and additionally communicate with the tables database 140 to determine whether to run an exercise cycle, what type of exercise cycle to run, and to determine whether the generator 10 is healthy or needs maintenance.

As noted above, one factor in determining whether to run an exercise cycle can be ambient temperature. The temperature sensor 102 can determine an ambient temperature and communicate that value to the exercise control system 120 to determine whether to run an exercise cycle. At low ambient temperatures, water condenses in the oil of the engine 12 because the engine 12 is not at a minimum temperature to evaporate the water. Running the engine 12 with water in the oil may cause damage to the engine 12.

Under an overcooled condition, the oil within the standby generator may not reach an optimal operating temperature. Overcooling may also lead to water being present within the oil system. During cold ambient temperatures (e.g., less than 40° F. (4.444° C.)), it may be desirable to not start the engine 12 of the standby generator 10 to avoid running with water in the oil system.

The voltage reading is used for various health checks of the generator 10. In one example, the voltage is used to determine the health of the battery 17. In this example, a voltage reading is taken before starting the generator and after starting the generator to determine the effect of running the generator on the voltage. As an example, if the voltage drops between the two readings, the generator likely needs maintenance and if the voltage stays the same or increases, the battery is likely functioning properly. The voltage reading additionally tests the recovery of the battery 17. As such, the voltage reading can measure the time it takes the battery 17 to recover back to a suitable voltage. In another example, the voltage reading is used to determine rotor/stator health of the generator. The rotor/stator generates voltage that can be read to be within a specific range for the particular generator to determine the health of the generator 10. Similarly, the voltage reading can be used to check generator sensing, which is related to the rotor/stator function. In yet another example, the voltage reading is used to determine the health of the voltage regulator, which is used to automatically maintain a constant output voltage level. When the generator 10 is started for a period of time (e.g., approximately 10 seconds), the output voltage can be monitored. In a further example, the voltage reading is used to check the brush function, field flash, and alternator buildup. In some cases, when residual magnetism is lost due to shelf time, improper operation, etc., the residual magnetism can be restored by a field flash. As a related matter, alternator buildup refers to when voltage is used to excite the field coils for the alternator to generate stronger voltage as part of its build up process. To test these functions, the output voltage is monitored based on the engine cranking RPM.

The pressure reading can be used to check the operation of the OPS in the system 100. The pressure value can be read without starting the engine. In some cases, the crank time for the engine needs to exceed 5 seconds for oil to build up to actuate the OPS. Additional time is needed for lubrication of bearings and other components.

The throttle position reading can be used to check the operation of the governor of the engine 12. In one embodiment, the throttle position reading is taken while the engine 12 is running to test the opening and closing of the throttle under various loads and/or engine speeds. In this regard, the throttle position sensing circuit 130 is communicably coupled to the speed sensing circuit 128 to determine the governor functionality.

For each set and/or combination of generator and/or engine conditions, a different look-up table may be generated and stored in the tables database 140 for access during operation. Additionally, user input into the user interface 150 may provide some of this information. In one embodiment, the user input may be provided by a user operating the engine and/or generator. In another embodiment, the user input may be preset, as indicated above, by the manufacturer of the engine and/or generator. User input may include conditions such as altitude, where the conditions are not going to change with changes in the engine operation.

To determine which information to pull and use from the tables database 140, the evaluation circuit 132 uses the values received by each of the sensing circuits (e.g., temperature sensing circuit 122, voltage sensing circuit 124, pressure sensing circuit 126, speed sensing circuit 128, and throttle position sensing circuit 130). In this regard, in one embodiment, the evaluation circuit 132 includes a communication circuit 134 to receive temperature, voltage, pressure, speed, and throttle position values from the engine 12 and use those values to make a determination regarding the exercise cycles and health of the generator 10. The evaluation circuit 132 may additionally be structured to communicate with the user interface 150 to notify a user when an exercise cycle is scheduled, has been performed, or when the generator 10 is experiencing maintenance issues. For example, if during an exercise cycle the evaluation circuit 132 determines that the voltage across the battery is dropping excessively while the generator 10 is running, the evaluation circuit 132 may communicate with the user interface 150 that maintenance is required. In this regard, the evaluation circuit 132 may include notification circuit 136 to generate a message for display on the user interface 150. The notification circuit 136 can generate a message for display on the user interface 150. As such, the notification circuit 136 is communicably and operatively coupled to the display circuit 154 of the user interface 150.

The timing circuit 138 is structured to determine the schedule, type, and duration of exercise cycles. The timing circuit 138 is structured to receive information from the evaluation circuit 132 and user input from the user interface 150 to make a determination regarding the schedule, type, and duration of exercise cycles. In this regard, the timing circuit 138 is communicably and operatively coupled to the evaluation circuit 132 and the user interface 150. In some embodiments, a user can override the set schedule, type, or duration of exercise cycles by inputting information into the user interface as described further herein. In other embodiments, the user cannot override the exercise cycle operation.

The user interface 150 includes a display circuit 154, and an input/output circuit 152. The display circuit 154 is used to present maintenance information, exercise cycle timing information, and the like to users on the user interface 150. In this regard, the display circuit 154 is communicably and operatively coupled to the input/output circuit 152 to provide a user interface for receiving and displaying information on the generator 10.

The input/output circuit 152 is structured to receive and provide communication(s) to a user (e.g., a dealer, a consumer) of the generator 10. In this regard, the input/output circuit 152 is structured to exchange data, communications, instructions, etc. with an input/output component of the generator 10. Accordingly, in one embodiment, the input/output circuit 152 includes an input/output device such as a display device, a touchscreen, a keyboard, and a microphone. In another embodiment, the input/output circuit 152 may include communication circuitry for facilitating the exchange of data, values, messages, and the like between an input/output device and the components of the generator 10. In yet another embodiment, the input/output circuit 152 may include machine-readable media for facilitating the exchange of information between the input/output device and the components of the generator 10. In still another embodiment, the input/output circuit 152 may include any combination of hardware components (e.g., a touchscreen), communication circuitry, and machine-readable media.

The exercise control system 120 will run an exercise cycle for a period of time at no load at regular intervals that are either set by the manufacturer or can be adjusted by an owner/operator. The evaluation circuit 132 evaluates the results of the exercise cycle. The evaluation circuit 132 can set the schedule for the exercise cycle runs to be according to any timeframe, including but not limited to, weekly, biweekly, monthly, bimonthly or quarterly or as initiated by the owner/operator. Further, the duration of each exercise cycle can be set from a minimum period of ten seconds to a maximum period of 45 minutes. The selection of the duration for each exercise cycle will be discussed in much greater detail below.

Figure 4:
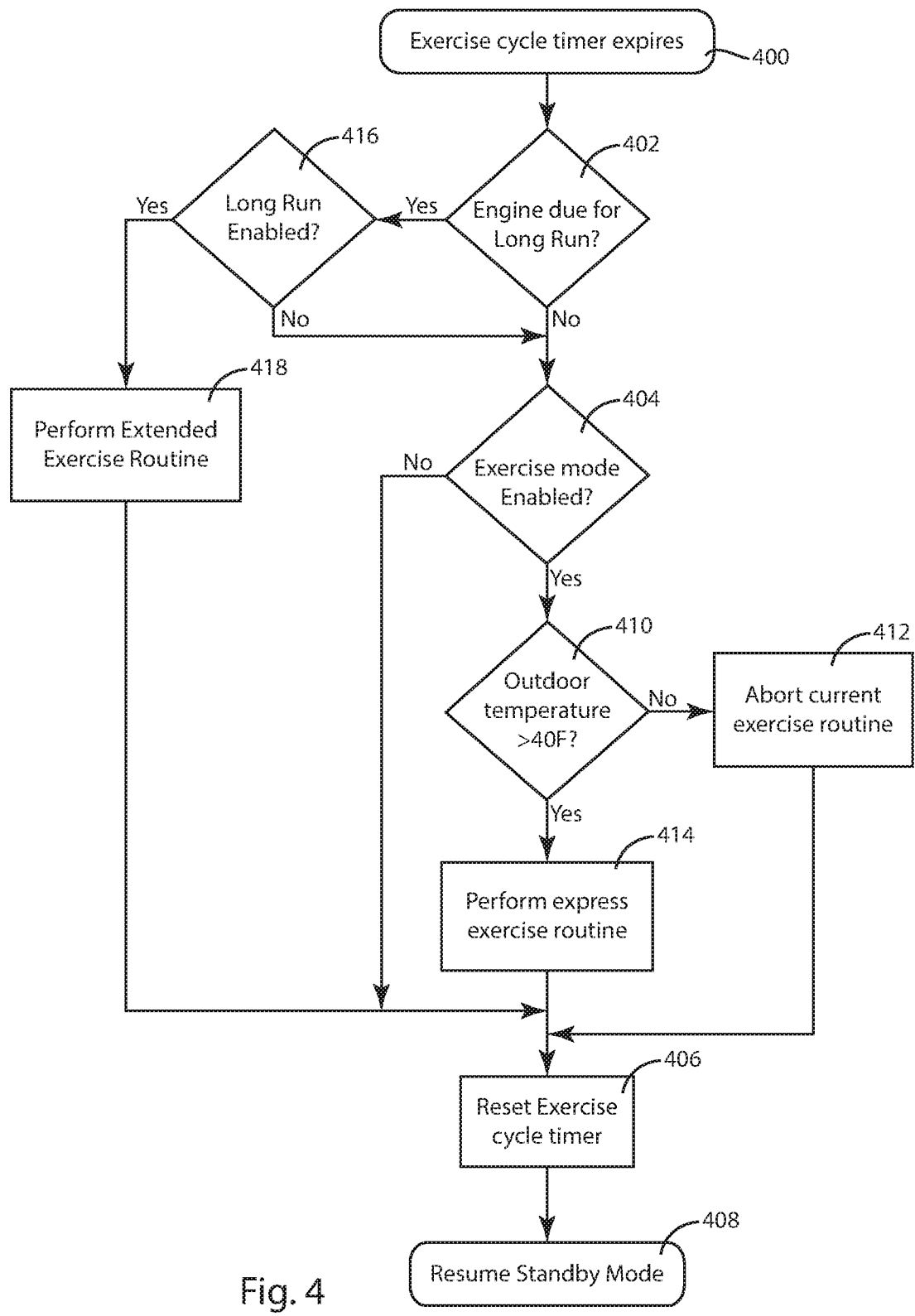
FIG. 4 is a flow diagram of an exercise cycle process for a standby generator, according to an exemplary embodiment.

Referring now to FIG. 4, one method the exercise control system of the standby generator can use to control the exercise cycle in accordance with the present disclosure is shown. Initially, in step 400, the timing circuit of the exercise control system determines that the exercise cycle timer has expired and the standby generator is due for an exercise cycle. The method proceeds to step 402 where the exercise control system determines whether or not the standby generator is due for an extended exercise cycle. As discussed previously, standby generators prior to the method of the present disclosure were operated for a set period of time, such as twenty minutes, for an exercise cycle. However, in accordance with the present disclosure, the method determines in step 402 whether the standby generator is due for an extended exercise cycle or an express exercise cycle. In the embodiment disclosed, the extended exercise cycle will have a duration of approximately forty-five minutes while the express exercise cycle will have a duration of approximately ten seconds. Both the duration of the extended exercise cycle and express exercise cycle can be adjusted by the user in accordance with one embodiment of the present disclosure.

If the engine is not due for a long run in the extended exercise cycle as determined in step 402, the method proceeds to step 404 where the exercise control system determines whether the exercise mode is enabled. The exercise mode may not be enabled by a manual entry by the user/operator or based upon sensed conditions of the generator. If the exercise mode is not enabled as determined in step 404, the system proceeds to step 406 where the exercise cycle timer is reset. As an illustrative example, if the exercise cycle timer is set for a weekly test interval, the exercise cycle timer will be reset in step 406 such that the next exercise cycle will not occur for another week at the expiration of the subsequent interval. Once the exercise cycle timer has been reset in step 406, the system proceeds to step 408 where the generator reenters the standby mode in which the generator will begin operation only upon an interruption in the utility power supply.

If the method determines in step 404 that the exercise mode is enabled, the method moves to step 410 where the exercise control system determines whether the ambient outdoor temperature exceeds a minimum threshold value, such as 40° Fahrenheit. As discussed previously, if the ambient temperature is below 40° Fahrenheit, there is a risk that water may condense in the oil of the engine because the engine is not at a minimum temperature to evaporate the water during the exercise cycle. Running the engine with the water in the oil may cause damage to the engine and the system determines in step 410 whether the ambient outdoor temperature exceeds 40° Fahrenheit. Although 40° Fahrenheit is set as the minimum threshold temperature, it should be understood that this temperature could be slightly modified depending on user preferences, humidity levels in the area of the generator or other relevant parameters that affect the accumulation of moisture in the engine oil.

If the outdoor air temperature is below 40° Fahrenheit, the method moves to step 412 where the current exercise routine is aborted and the system proceeds to step 406 where the exercise cycle timer is reset.

If the system determines in step 410 that the ambient temperature exceeds the minimum temperature threshold, the system moves to step 414 where the express exercise cycle is performed. As discussed previously, the duration of the express exercise cycle performed in step 414 can be adjusted between a minimum duration of ten seconds and a maximum duration of twenty minutes. It is contemplated that the ten second minimum duration would be sufficient to ensure that the engine of the standby generator is functional and to make several measurements utilizing the sensors shown in FIG. 2. Selecting a relatively short duration of ten seconds will reduce the amount of fuel consumed, reduce the noise generated, reduce fuel emissions, prevent the accumulation of moisture and provide for a more desirable experience for the owner.

Once the express exercise cycle has been completed in step 414, the system moves to step 406 and resets the cycle timer such that the next exercise cycle will occur at the expiration of the desired interval.

Referring back to step 402, if the engine is due for a long run, the method proceeds to step 416 where the exercise control system determines whether the long run is enabled. The user/operator may disable the long run or the long run may be disabled if operating parameters of the generator indicate that such long run should not be started. However, if the long run is enabled in step 416, the method proceeds to step 418 where the exercise control system performs the extended run exercise cycle. It is contemplated that the extended run exercise cycle may be scheduled to run at extended intervals that are much longer than the interval between the express exercise cycles, such as twice a year, such as during the spring season and the fall season. The extended run may have an extended duration as compared to prior systems, such as forty-five minutes. By operating the engine of the standby generator for this extended forty-five minute duration, any moisture accumulated with the engine oil is allowed to burn off since the operating temperature of the engine will rise to a level that will burn off any accumulated moisture. Since the operation of the engine for this forty-five minute period will burn off any excess moisture, the system does not need to determine whether the ambient temperature exceeds a minimum temperature threshold, such as was determined in step 410. Typically, the long, extended run exercise cycles are set to occur twice a year but can be disabled by the operator such that only the express exercise cycles will occur.

Although the method of FIG. 4 initiates the extended exercise cycle based upon the expiration of a cycle timer such that the extended exercise cycles occur at defined time intervals, it is contemplated that the extended exercise cycles could occur after a predetermined number of express exercise cycles have occurred. For example, an extended exercise cycle may occur after twenty express exercise cycles have occurred. In such an embodiment, since the express exercise cycles are set to occur at predetermined intervals that can be interrupted by the ambient temperature not reaching a threshold value, tying the extended exercise cycles to the number of express exercise cycles that have occurred ensures that an extended exercise cycle will occur after the generator has been exercised for short periods of time over an extended interval.

As described with respect to step 412, the express exercise cycle is aborted when the ambient temperature does not reach a temperature threshold. It is contemplated that instead of resetting the exercise cycle timer in step 406, the method could continue to monitor the ambient temperature and perform an express exercise cycle when the ambient temperature exceeds the temperature threshold. In cold weather environments, the express exercise cycles could be suspended for weeks or months depending upon the ambient temperature at the location of the generator. By tying the operation of the express exercise cycle to the ambient temperature and beginning the express exercise cycle when the ambient temperature exceeds the temperature threshold, the exercise control system will insure that the generator operation is tested as soon as the ambient temperature exceeds the threshold.

As discussed above, the exercise control system of the present disclosure includes two distinct exercise cycles that have different durations. The first exercise cycle is an extended exercise cycle that has a duration sufficient to make sure that any moisture accumulated in the oil will be evaporated due to the rise in the engine temperature during the extended exercise cycle. The extended exercise cycle can have a duration of approximately forty-five minutes although other durations are contemplated as long as the duration is sufficient to evaporate any water accumulated in the oil. The engine of the standby generator can also be operated in an express exercise cycle that has a duration much shorter than typically used. The express exercise cycle can have a duration of approximately ten seconds. The short, ten second duration of the express exercise cycle reduces noise, fuel consumption and fuel emissions while insuring that the engine of the standby generator is operational. The use of the combination of the extended exercise cycle and express exercise cycle insures that the engine of the standby generator is properly tested at the extended intervals of the extended exercise cycle yet is tested at shorter intervals to make sure that the engine is operational by using the express exercise cycles.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of exercising a standby generator, comprising:
    determining if the standby generator is due for an extended exercise cycle;
    starting an engine of the standby generator and running the engine for the extended exercise cycle when the standby generator is due for the extended exercise cycle independent of an ambient temperature at or near the standby generator;
    determining if the standby generator is due for an express exercise cycle upon determining that the standby generator is not due for the extended exercise cycle;
    detecting the ambient temperature at or near the standby generator; and
    starting the engine of the standby generator and running the engine for the express exercise cycle upon determining that the standby generator is due for the express exercise cycle and the ambient temperature exceeds a minimum threshold temperature.

2. The method of claim 1 wherein a duration of the extended exercise cycle is at least double a duration of the express exercise cycle.

3. The method of claim 2 wherein the duration of the extended exercise cycle is forty-five minutes and the duration of the express exercise cycle is ten seconds.

4. The method of claim 2 wherein the duration of the express exercise cycle is adjustable.

5. The method of claim 1 wherein the extended exercise cycle is scheduled to occur at a first interval and the express exercise cycle is scheduled to occur at a second interval, wherein the first interval is longer than the second interval.

6. The method of claim 5 wherein the express exercise cycle is skipped when the ambient temperature does not exceed the minimum threshold temperature.

7. The method of claim 6 further comprising a step of restarting the second interval if the express exercise cycle is skipped.

8. The method of claim 6 further comprising steps of:
monitoring the ambient temperature after the express exercise cycle is skipped;
starting the engine and running the engine for the express exercise cycle when the ambient temperature exceeds the minimum threshold temperature; and
restarting the second interval after executing the express exercise cycle.

9. The method of claim 1 wherein the extended exercise cycle occurs after a predetermined number of express exercise cycles have occurred.

10. The method of claim 1 wherein the minimum threshold temperature is approximately 40 F.

11. A standby generator comprising:
an engine;
an ambient temperature sensor configured to detect an ambient temperature at or near the engine; and
a controller programmed to:
receive the detected ambient temperature from the ambient temperature sensor;
determine if the standby generator is due for an extended exercise cycle;
start the engine of the standby generator and run the engine for the extended exercise cycle when the standby generator is due for the extended exercise cycle independent of the detected ambient temperature;
determine if the standby generator is due for an express exercise cycle after determining that the standby generator is not due for the extended exercise cycle; and
start the engine of the standby generator and run the engine for the express exercise cycle upon determining the standby generator is due for the express exercise cycle and receiving an indication from the ambient temperature sensor that the ambient temperature at or near the engine exceeds a minimum threshold temperature.

12. The standby generator of claim 11 wherein a duration of the extended exercise cycle is at least double a duration of the express exercise cycle.

13. The standby generator of claim 12 wherein the duration of the extended exercise cycle is forty-five minutes and the duration of the express exercise cycle is ten seconds.

14. The standby generator of claim 12 wherein the duration of the express exercise cycle is adjustable.

15. The standby generator of claim 11 wherein the extended exercise cycle is scheduled to occur at a first interval and the express exercise cycle is scheduled to occur at a second interval, wherein the first interval is longer than the second interval.

16. The standby generator of claim 15 wherein the controller skips operation of the express exercise cycle when the ambient temperature does not exceed the minimum threshold temperature.

17. The standby generator of claim 16 wherein the controller restarts the second interval if the express exercise cycle is skipped.

18. The standby generator of claim 16 wherein the controller:
monitors the ambient temperature after the express exercise cycle is skipped;
starts the engine and runs the engine for the express exercise cycle when the ambient temperature exceeds the minimum threshold temperature; and
restarts the second interval after executing the express exercise cycle.

19. The standby generator of claim 11 wherein the extended exercise cycle occurs after a predetermined number of express exercise cycles have occurred.

20. The standby generator of claim 11 wherein the minimum threshold temperature is approximately 40 F.

* * * * *